June 13, 1950 W. F. ROBB 2,511,079
MOLDING APPARATUS

Filed Feb. 5, 1947 3 Sheets-Sheet 1

Inventor
Wayne F. Robb
by Parham & Bates
Attorneys

June 13, 1950  W. F. ROBB  2,511,079
MOLDING APPARATUS
Filed Feb. 5, 1947  3 Sheets-Sheet 2

Inventor
Wayne F. Robb
by Parham & Bates
Attorneys

June 13, 1950   W. F. ROBB   2,511,079
MOLDING APPARATUS
Filed Feb. 5, 1947   3 Sheets-Sheet 3

Inventor
Wayne F. Robb
by Parham + Bates
Attorneys

Patented June 13, 1950

2,511,079

UNITED STATES PATENT OFFICE 2,511,079

MOLDING APPARATUS

Wayne F. Robb, Irvington, N. J., assignor to Shaw Insulator Company, Irvington, N. J., a corporation of New Jersey Application February 5, 1947, Serial No. 726,675

6 Claims. (Cl. 18—42)

This invention relates to the molding of articles of plastic material and consists in improved molding apparatus with which to form such articles and eject them from the forming molds. The invention is particularly useful in the molding of certain articles, such as, for example, iron handles, which because of their shapes require undercutting at the parting line of the mold. This undercutting is customarily accomplished with cores removably located relative to the mold cavities.

Heretofore, a variety of practices have been employed in stripping undercutting cores from molded articles.

One practice provides for the removal or ejection of the molded articles from the mold cavities and the subsequent stripping of the cores from the article outside and away from the mold. In accordance with a second practice, the core molding the undercut also serves to separate or eject the article from the mold cavities and, thereafter, the molded article is stripped by hand from the core.

According to another practice, the core molding the undercut is so assembled in the mold that it may be withdrawn from the undercut formed by it, before the molded article is ejected from the cavity.

These as well as alternative practices presently followed, have one or more disadvantages including: high labor consumption per article; inaptability to multiple article, high speed production; inability to maintain accurate tolerances; and poor adaptability for incorporation of a multiple mold core and ejection system in a single assembly that can be readily installed in and removed from a mold assembly without disturbing the mounting or assembly of the heavy mold frame and cavities which are rigidly attached to the press proper.

The present invention eliminates or substantially reduces all of these as well as other disadvantages of present molding practices and equipment. The invention generally provides an undercutting core assembly that is automatically accurately located relative to the mold cavities in their closed or molding positions; which assembly is operable to remove or eject the molded articles with their cores from the forming cavities and thereafter to strip the articles from their undercutting cores and present the cores for automatic incorporation in the subsequent molding operation.

The embodiment of the invention illustrated in the drawings and hereinafter described more in detail, generally comprises a plurality of cores for molding the undercuts of several simultaneously molded parts. The cores are fastened to a main ejector mechanism in such a way that they may be removed at any time from the mold without disassembly of any other section of the mold. The cores, being fastened to the main ejector mechanism, remove the molded parts from the mold cavities when the main ejector mechanism is actuated, and they remain a part of the mold assembly during production of the molded parts. The molding cores, in turn, support a secondary ejector mechanism which moves with the cores when the molded parts are ejected from the mold cavities by the movement of the main ejector mechanism. The secondary ejector mechanism, however, remains stationary with respect to the cores during this main ejection motion. Operation of the secondary mechanism is effected independently of and subsequent to the operation of the first mechanism to strip the molded parts from the cores. The molded parts are then entirely free from any part of the mold, and may be forwarded immediately to the next production step following molding of the parts.

The advantages of novel core assemblies and ejection systems incorporating the present invention may be obtained in all types of molding practices including injection, compression, and transfer molding.

In order that the invention may be more fully understood and its advantages appreciated, reference is made to the accompanying drawings which illustrate an embodiment thereof and in which drawings.

Figure 1:
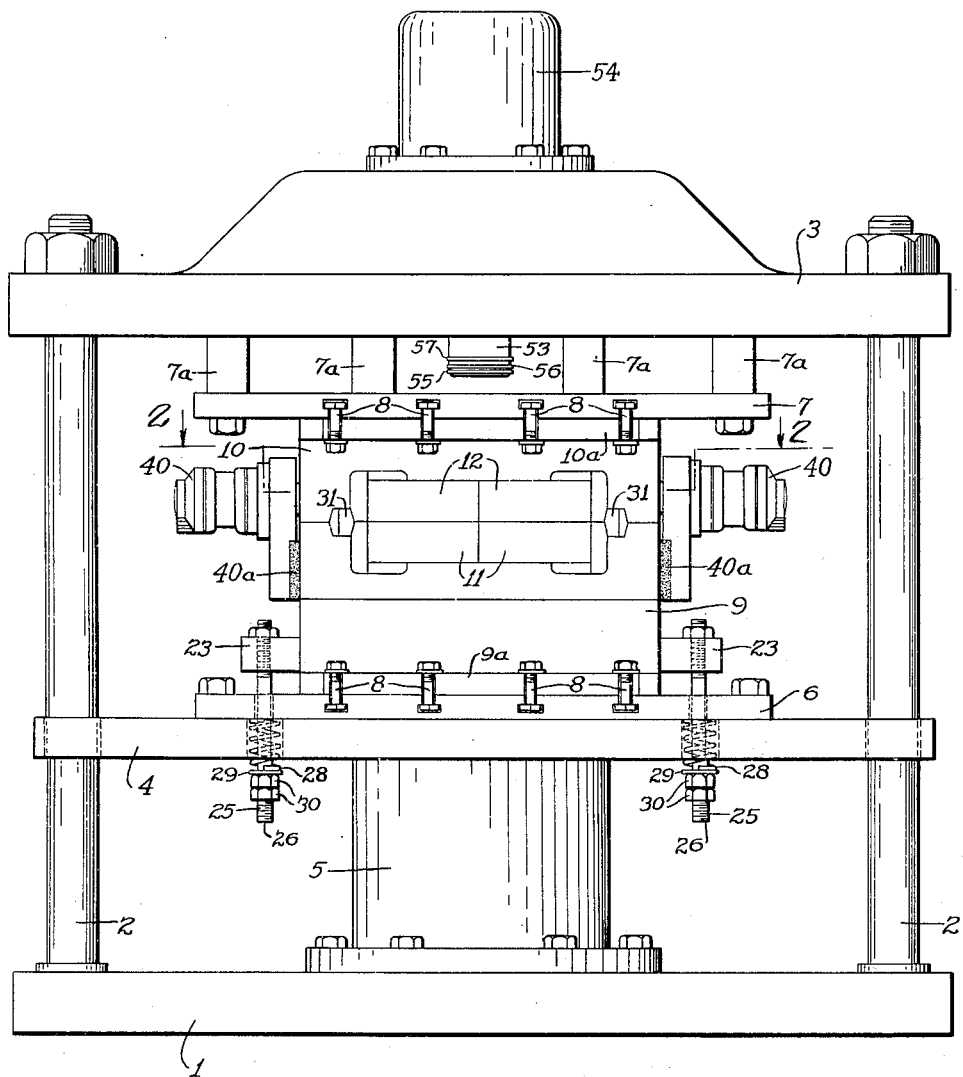
Fig. 1 is a vertical elevation of a conventional transfer molding press in which is located molding apparatus embodying the invention, showing the parts of the press and molding equipment in their closed molding positions before the transfer plunger has pressed the plastic resin into the mold.

The present invention may be employed in a variety of different molding presses, illustrative of which is the press shown in the drawings which is of upstroke design and includes a lower or fixed bed plate 1 to the corners of which are secured vertical strain rods 2 which support a horizontal upper head or force plate 3. The rods 2 further function as guides which prevent lateral movement of an intermediated platen 4 carried by a ram 5. The ram may be operated by suitable fluid pressure or other control mechanism, not shown, to raise and lower the platen 4 into and out of pressing relation with the upper head 3. Bolted to opposing horizontal faces of the platen 4 and head 3 are lower and upper mounting plates 6 and 7 to which the lower and upper halves, respectively, of a two part die are readily centered and secured as by bolts 8.

Figure 4:
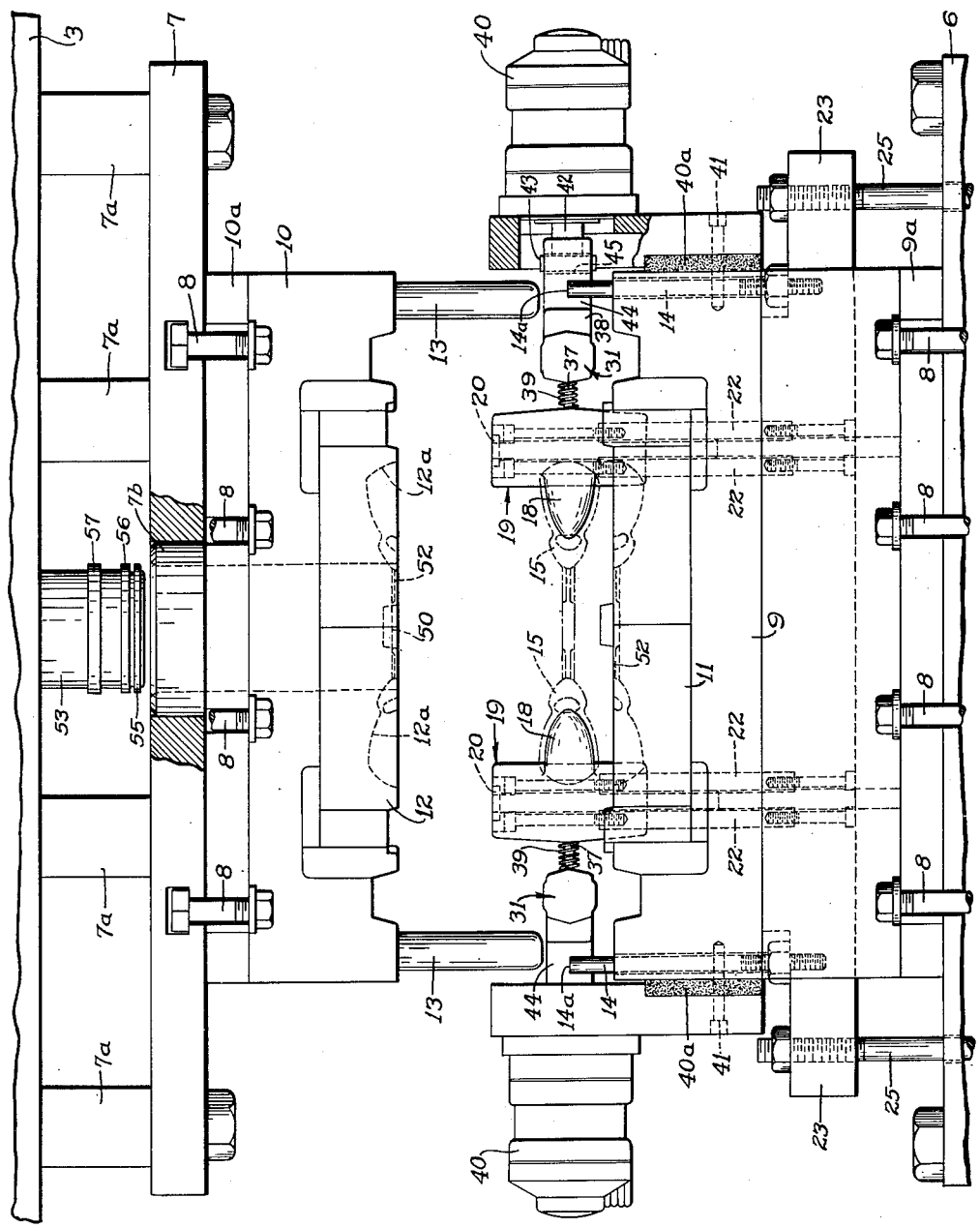
Fig. 4 is an enlarged view of the molding portion of the apparatus shown in Fig. 1 in the fully open position prior to operation of the core stripping mechanism.

As best seen in Figs. 1 and 4, the upper mounting plate 7 is spaced at a distance from the head 3 by spacers or separators 7a. The space thus provided between the upper mounting plate 7 and the head 3 facilitates the charging of molding material into the feeding mechanism.

In the embodiment illustrated, feeding is by the transfer process from the loading chamber or pot 7b (Fig. 3) to the mold cavity proper, as will be hereinafter explained more in detail. However, the advantages of the present invention are not limited to transfer molding technique and similar advantages are obtainable with pressure or injection molding in which case the spacers 7a are not necessarily employed.

Referring more particularly to Fig. 4, a die assembly embodying the present invention includes conventional lower and upper frame members 9 and 10 having mounting flanges 9a and 10a, respectively, securable to the mounting members 6 and 7 by the bolts 8. Lower and upper cavity or mold members 11 and 12 are secured in the lower and upper frame members 9 and 10 and respectively contain the lower and upper die cavities 11a and 12a. The mold members 11 and 12 may be heated in conventional manner as by steam passage therein.

Alignment of the lower and upper frame members 9 and 10, and the cavity members 11 and 12 carried thereby, in their closed or molding positions is achieved by guide pins 13 which are secured in and extend downwardly from the four corners of the upper frame members 10 and cooperate with underlying guide ways 16 (Fig. 3) in the lower frame member 9.

In order that successive closings will not cause damage to the cavity members 11 and 12, the initial shock of closing is absorbed by steel safety pins 14. Four such pins 14 (Fig. 2) are adjustably secured to the knockout bar 23 and extend vertically upward through the lower frame member 9. The pins 14 are adjusted so that their upper ends 14a, rather than the wedge, absorb the impact of the upper cavity upon closing of the mold, and the pins engage the bottom of the upper frame member 10 slightly before, as for example, several thousandths of an inch before, parting surfaces of the cavity members 11 and 12 engage. It will be understood that the steel pins 14 are sufficiently compressible under the load of the press so as to permit closure of the cavity members 11 and 12 while, at the same time, preventing damaging pressure between the cavity members. The safety pins 14 also prevent damaging engagement of the upper cavity 12 and the wedges 19 in the event that the wedges are not properly seated in the lower cavity 11 when the mold is closed.

Compressive forces in the pins 14 also serve to assure separation of the die members 11 and 12 when the press is open even if there is a tendency for the members to stick.

Figure 2:
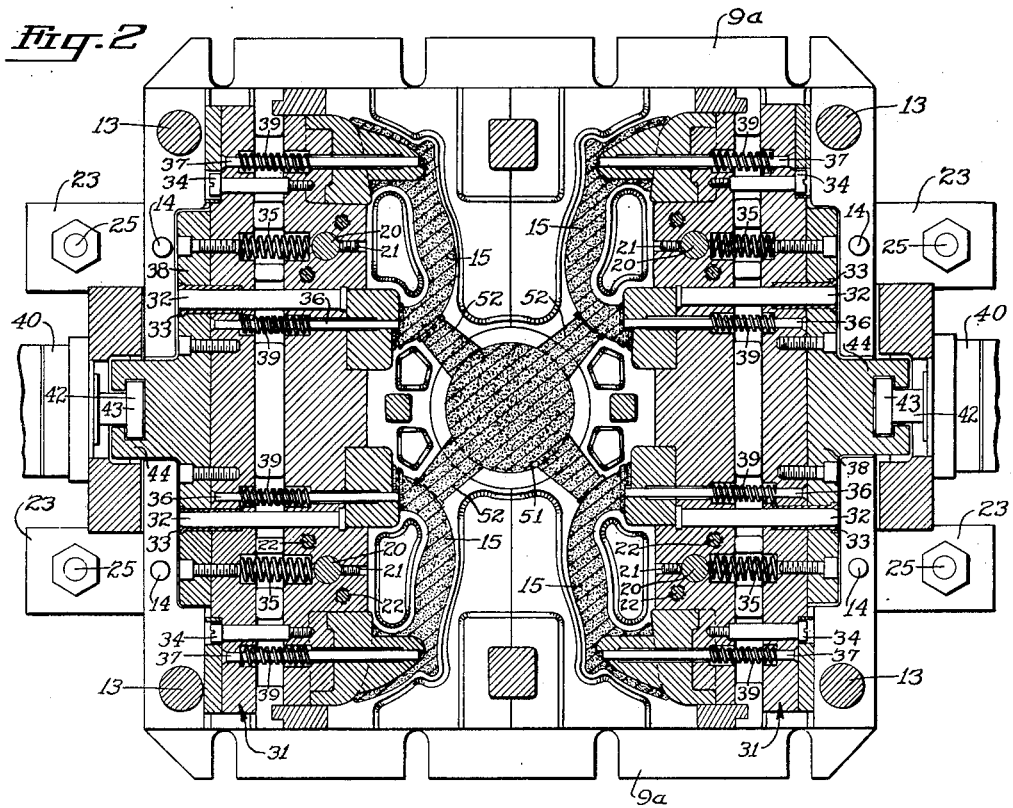
Fig. 2 is a cross-sectional view taken along line 2—2 of Fig. 1, which line generally coincides with the parting line of the mold members, and wherein the molded articles and core stripping mechanism is shown in cross-section.

When the members 11 and 12 are in assembled or molding position, the cavities 11a and 12a constitute a mold which, as best seen in Figs. 2 and 4, is designed and shaped to produce four iron handles 15 of generally conventional design. As is frequently the case in molding plastic articles, it is necessary to undercut the mold at the parting line of the die members 11 and 12. The undercutting of each handle 15 is accomplished with cores 18 which are secured to wedges or trays 19.

In accordance with the present invention, the trays 19 are mounted for vertical reciprocal movement relative to the mold members 11 and 12, the latter and the frames 9 and 10 being appropriately recessed so as to snugly receive the trays in the closed or molding position of the mold members.

Figure 3:
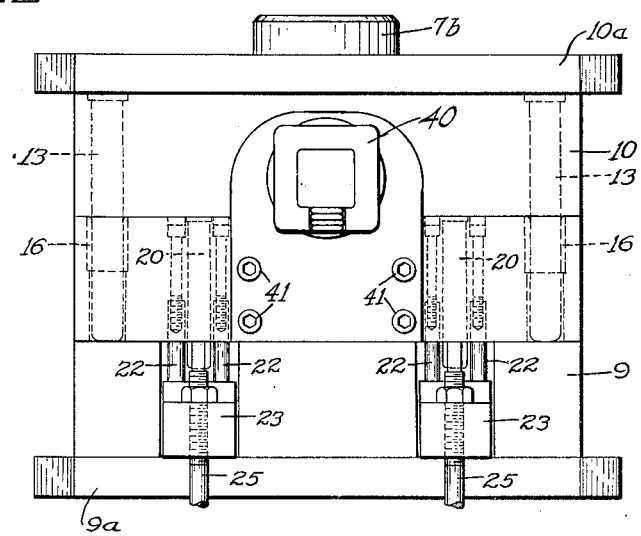
Fig. 3 is a vertical profile elevation of a portion of the apparatus shown in Fig. 2 as seen from the left side of that figure.

Referring more particularly to Figs. 2, 3 and 4, the trays 19 are secured as by means of the set screws 21 to spaced vertical guide rods 20 which extend downwardly through suitable guideways in the lower mold assembly. The guide rods 20 limit the wedges or trays 19 to vertical reciprocal movement and direct them into proper alignment with the lower cavity member 11 when the mold is closed.

In opening the mold following a molding operation, means are provided for moving the trays 19 and the cores 18 upward from the lower cavity to the position illustrated in Fig. 4. To this end, the wedges are secured to connecting pins 22, a pair of which may be located adjacent each guide pin 20. The lower ends of the pins 22 extend downwardly through suitable openings in the mold cavity member 11 and frame 9 and are secured as by bolts to knockout bars 23.

As illustrated in the drawings, two such knockout bars 23 are provided. Each knockout bar is provided at its ends with a knockout pin 25 which is adjustably secured therein so that the lower ends 26 will engage the base plate 1 at a desired point in the downward travel of the platen 4. Located about each knockout pin 25 is a spring 28 that bears on the lower mounting member 6 and a washer 29, the position of which can be varied by adjustment of nuts 30 to adjust the compression of the spring. The springs 28 resiliently urge the knockout bars 23 and the wedges 18 carried thereby to the lowermost position permitted by the seating of the wedge in the lower cavity member 11 and the frame 9. The wedge is forced upwardly from that position when the knockout pins 25 engage the base plate 1 and overcomes the action of the springs 28. Movement of the wedge and the cores carried thereby from the lower cavity member automatically strip molded articles from the cavity 11a.

In accordance with the present invention, means also are provided for stripping the molded articles from the cores 18 following ejection of the articles from the lower mold cavity 11a. In the embodiment illustrated, the stripping is performed by a secondary ejector system.

Referring to Figs. 2 and 4, the secondary ejector system includes ejector bars indicated generally by the numeral 31 which are mounted outboard of the trays or wedges 19. Horizontally outwardly extending guide pins 32 secured in the wedges 19 cooperate with bushings 33 in the secondary ejector bar 31 so as to limit the latter to horizontal movement relative to the wedge, the outward movement of the bar 31 being limited by engagement with the heads of bolts 34 secured in the wedge. Each bar 31 is normally urged to this outer position by springs 35 compressed between the bar and its wedge. Knockout pins 36 and 37 are secured to the bars 31, as by means of cap plates 38, and the pins extend inwardly through suitable openings in the wedge so that their inner ends constitute a molding surface for portions of the iron handles. In the case of knockout pins 36, each pin engages the under surface of the forward ends of a molded iron handle and each pin 37 extends through one of undercutting cores 18 so that the end of each pin in its retracted or outer position forms a portion of the tip of the core.

As illustrated in Fig. 2, the pins 36 and 37 are horizontally disposed and so located that they can be forced inwardly to strip the handles from the undercutting cores 18. A spring 39 is located about each pin 36 and 37, the springs being compressed between the tray 19 and the knockout member 31 to augment the action of springs 35 and prevent cocking of the ejector bar 31 and its knockout pins 36, 37.

The operation of the ejector bars 31 and the ejector pins 36 and 37 carried thereby is effected by means of motors 40 secured by bolts 41 to the lower frame member 9 outboard of each ejector bar 31 (Fig. 4). Insulation block 40a is disposed between each motor 40 and the frame to reduce heat transmission therebetween. The motors 40 may be of conventional design, those illustrated being operated by air pressure and having a horizontally disposed, reciprocating piston rod 42, the inboard end of which has a flange 43 engageable with a yoke 44 forming part of the cap plate 38. The yoke is formed with a vertically disposed slot or recess channel 45 which permits vertical movement of the flanged piston rod end 43 relative to the yoke while maintaining a cooperative relationship therebetween which assures simultaneous horizontal movement of those parts. As best seen in Figs. 2 and 4, this construction permits relative vertical movement between the ejector bars 31 and the lower frame member 9 upon which is mounted the motor 40.

As was hereinbefore indicated, the illustrated molding device is charged by the transfer method. To this end, the vertical charging chamber or well 7b (Fig. 4) extends from the upper mounting plate 7 through the upper frame member 10 and cavity member 12. A bottom 51 of the well 7b is formed in the lower cavity member 11 and the cavity members are channeled at 52 to provide gates connecting the well 50 with the mold cavities 11a and 12a.

A vertically reciprocal transfer plunger 53 is reciprocably movable into and out of the well 7b by means of a motor 54 secured to the head 3 of the press. The lower end of the piston plunger 53 is provided with closely spaced rings 55, 56 and 57 which insure a close pressure fit with the walls of the charging chamber 7b.

The operation of the device heretofore described is as follows: The heated mold is moved to its closed position (Fig. 1) and a charge of thermo-setting plastic, as for example, a pre-weighed briquette of a phenolic resin is heated in the charging chamber 7b. The transfer plunger 53 forces the heated resin through the gates 52 into the mold cavities 11 and 12. After a suitable curing time during which the resin is thermally set, the transfer plunger 53 is retracted and the ram 5 lowered to open the press. The compressive forces of the pins 15 separate the grid members 9 and 10 should they tend to stick, and the knockout pins 25, upon engagement with the bed plate 1, restrain the knockout bars 23 and the wedges 19 secured thereto in an intermediate position while the lower frame member moves to its lower open position (Fig. 4). The separation of the wedges 19 from the lower frame 9 causes the cores 18 to withdraw the molded articles 15 from the lower cavities 11a. As they are withdrawn, the four iron handles 15 are connected by a thin flash formed in the gates 52 and the well bottom 51. Thereafter, operation of the motors 40 and inward movement of the piston rod 42 effects correspondent inward movement of the secondary ejector bars 31 and the ejector pins 36, 37. The ends of these pins force the iron handles from the cores 18 and break the connecting flash at its weakest points which are adjacent the iron handles. The ejector bars may now be withdrawn by the motors 40 to their outboard positions and following the removal of the iron handles and all excess molding material from between the mold members 11 and 12, ram 5 is raised to close the mold for a subsequent molding operation.

An alternative method of breaking the flash connecting the molded objects should the operation of the ejector bar 31 not attain satisfactory results may be effected by a slight modification of the press and transfer plunger cycle. To this end, the transfer plunger 53 may be retained in its lowermost position until the lowering movement of the ram 5 has been initiated. Whereas in the operational cycle heretofore described, retraction of plunger 53 ruptures the plastic material connection between the flash and the material gripping the plunger rings 55 and 56 without rupturing the flash which is securely held by the cavity members 11 and 12; in the modified cycle, the flash is withdrawn with the molded articles 15 from the upper cavity 12a without the cooperating support of the cavity members 11 and 12 and the connection formed by the excess material with the rings 55, 56 acts to fracture the flash at the weak points adjacent the iron handles proper.

It will be seen that the present invention provides a multiple mold die assembly, each mold having an undercutting core which is automatically accurately located relative to the mold cavities in their closed or molding positions.

It further provides an ejector system which automatically removes the molded articles from their molds and from their undercutting cores and thereafter automatically presents the cores for incorporation in the subsequent molding operation.

The mold cores and ejector mechanisms of the assembly, heretofore described, readily may be removed separately or as an assembly from the press for the maintenance of these more fragile sections, without touching the mounting or assembly of the heavy mold frames and cavities which are rigidly attached to the press proper.

Various changes may be made in the construction and arrangement of parts of the illustrated embodiment of the present invention without departing from the scope of the appended claims. The invention may be utilized in various types of molding presses and is not limited in its application to the upstroke-type transfer molding press illustrated in the drawings.

Having thus described my invention, what I claim is:

1. A mold assembly for molding an article with an undercut comprising mold members movable between opened and closed positions and having mold cavities therein, a wedge member movable in the direction of movement of said mold members and secured in said mold members in their closed positions, a core rigidly carried by said wedge, said core extending into the molding cavity at an angle relative to the line of movement of the members, a knockout member operable upon movement of the mold members to the open position for withdrawing the wedge, the core and an article molded thereon from the mold cavities, a secondary ejector member operably mounted within said core for stripping the molded articles from the core and including a molding surface, means for moving the mold members between their opened and closed positions, and means independent of said mold moving means for actuating said secondary ejector member.

2. The mold assembly defined in claim 1 wherein the secondary ejector member may be actuated by its actuating means in the open position of the mold members and is disengaged from and unresponsive to the action of said means in another position of said mold members.

3. A mold assembly for molding an article with an undercut comprising mold members movable between opened and closed positions and having mold cavities therein, a core mounted for reciprocal movement only relative to said mold members and secured by said members in their closed positions, the secured core being located in the mold cavity in the closed position at a right-angular position relative to the line of movement of the members, means for positively withdrawing the core and an article molded thereon from the mold cavities of both mold members, and secondary ejector means operably mounted within said core for stripping the molded articles from the core.

4. Apparatus as described in claim 3 and including means restraining movement between said core withdrawing means and one of said mold members and adjustable means for counteracting said restraining means and effecting movement therebetween.

5. Apparatus for molding an article with an undercut comprising mold members movable between opened and closed positions and having mold cavities therein, means for heating said mold members, pressure means for opening and closing said mold members, a member including a core mounted for parallel reciprocal movement relative to said mold members in their open positions and secured by said members in their closed positions, and stripping means operably mounted within the core and movable at an angle to the direction of movement of the core and the mold members, and means engaged by said stripping means only when said mold members are in their open positions for operating said stripping means.

6. A mold assembly for molding a plurality of articles having undercuts comprising mold members reciprocable between open and closed positions, said members forming a plurality of mold cavities in their closed positions, a knockout bar operably mounted for parallel movement relative to said mold members, pins secured to said bar in alignment with the direction of movement of said bar and mold members, a wedge secured to said pins, the wedge, pins and knockout bar being movable as a unit when the mold members are in an opened position and secured by the mold members when the mold is closed, a core projecting from the wedge at an angle relative to the direction of movement of the wedge, said core being located by the wedge in molding position in the closed mold, means for opening and closing said mold members, spring means restraining movement of the core relative to one of said mold members, adjustable means associated with said knockout bar for overcoming said restraint and moving said core, and a core stripping member movable at an angle to the movement of the core only when the core has been moved from the mold member to which it is resiliently restrained.

WAYNE F. ROBB.

REFERENCES CITED

The following references are of record in the file of this patent:

UNITED STATES PATENTS

| Number | Name | Date |
| --- | --- | --- |
| 1,954,036 | Bickerstaff | Apr. 10, 1934 |
| 1,971,849 | Brundage | Aug. 28, 1934 |
| 2,111,857 | Jeffery | Mar. 22, 1938 |
| 2,200,634 | O'Koomian | May 14, 1940 |
| 2,401,728 | Gillette et al. | June 11, 1946 |
| 2,421,058 | Eckstein | May 27, 1947 |
| 2,436,065 | Dewey, Jr. | Feb. 17, 1948 |

FOREIGN PATENTS

| Number | Country | Date |
| --- | --- | --- |
| 350,810 | Great Britain | June 18, 1931 |